(12) United States Patent
Nakashima et al.

(10) Patent No.: US 10,611,429 B2
(45) Date of Patent: Apr. 7, 2020

(54) MOTORCYCLE AND CONTROL METHOD THEREOF, AND SEMICONDUCTOR DEVICE

(71) Applicant: Renesas Electronics Corporation, Tokyo (JP)

(72) Inventors: Shoji Nakashima, Tokyo (JP); Masanao Yokoyama, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 18 days.

(21) Appl. No.: 15/397,771

(22) Filed: Jan. 4, 2017

(65) Prior Publication Data

US 2017/0267245 A1 Sep. 21, 2017

(30) Foreign Application Priority Data

Mar. 18, 2016 (JP) .................. 2016-055201

(51) Int. Cl.
*B60W 30/18* (2012.01)
*B62L 3/02* (2006.01)
*B60T 17/22* (2006.01)
*B60T 13/66* (2006.01)
*B62J 99/00* (2020.01)

(52) U.S. Cl.
CPC ............ *B62L 3/023* (2013.01); *B60T 13/662* (2013.01); *B60T 17/22* (2013.01); *B60W 2300/36* (2013.01); *B60Y 2200/13* (2013.01); *B62J 2099/002* (2013.01)

(58) Field of Classification Search
None
See application file for complete search history.

(56) References Cited

U.S. PATENT DOCUMENTS

| | | | |
|---|---|---|---|
| 2002/0185355 A1* | 12/2002 | Drussel | F16D 23/12 192/83 |
| 2008/0045380 A1* | 2/2008 | Ebner | B60W 30/19 477/94 |
| 2016/0039421 A1* | 2/2016 | Kaneta | B60W 30/18118 477/73 |

FOREIGN PATENT DOCUMENTS

| | | |
|---|---|---|
| JP | 62-43067 U | 3/1987 |
| JP | 5-180244 A | 7/1993 |
| JP | 2004-210110 A | 7/2004 |
| JP | 2009-79607 A | 4/2009 |
| JP | 2009-179260 A | 8/2009 |
| JP | 2011-230667 A | 11/2011 |

OTHER PUBLICATIONS

Japanese Office Action received in corresponding Japanese Application No. 2016-55201 dated Oct. 29, 2019.

* cited by examiner

*Primary Examiner* — Todd M Melton
*Assistant Examiner* — Jason R Roberson
(74) *Attorney, Agent, or Firm* — Mattingly & Malur, PC

(57) ABSTRACT

A motorcycle (300) includes a clutch lever (14), a clutch switch (15) configured to detect whether or not the clutch lever (14) is gripped, a vehicle speed sensor (16) configured to detect a vehicle speed, a hydraulic rear brake (18), a pressurizing unit (17) configured to perform a pressurizing process that applies an oil pressure to the rear brake (18), and a microcontroller (19) configured to control the pressurizing process by the pressurizing unit (17) based on results of the detection by the vehicle speed sensor (16) and the clutch switch (15).

14 Claims, 8 Drawing Sheets

MOTORCYCLE AND CONTROL METHOD THEREOF, AND SEMICONDUCTOR DEVICE

CROSS-REFERENCE TO RELATED APPLICATIONS

This application is based upon and claims the benefit of priority from Japanese patent application No. 2016-055201, filed on Mar. 18, 2016, the disclosure of which is incorporated herein in its entirety by reference.

BACKGROUND

The present invention relates to a motorcycle, and, for example, the present invention can be preferably applied to a motorcycle including a hydraulic rear brake.

On a motorcycle, a driver's right hand operates a throttle and a front brake lever that are provided in a right handlebar. On the other hand, a driver's left hand operates a clutch lever provided in a left handlebar.

A driver's right foot operates a rear brake pedal provided on a right footrest. On the other hand, a driver's left foot performs a shift operation.

Related art, for example, Japanese Unexamined Patent Application Publication No. 2009-179260, discloses an interlocking brake device of a motorcycle that supplies an oil pressure according to an operation of a rear brake pedal to a rear brake and also supplies a part of the oil pressure to a front brake.

SUMMARY

When a motorcycle is to be started on a flat place, a driver starts an engine first, and then the driver grips a clutch lever by his or her left hand, uses his or her left foot to shift from neutral into a first gear, and releases the clutch lever while opening a throttle by his or her right hand to thereby move the motorcycle forward.

On the other hand, when a motorcycle is to be started on an inclined place such as a slope, a driver operates a rear brake pedal by his or her right foot in addition to the operations done when the motorcycle is to be started on a flat place in order to prevent a motorcycle body from moving backward or forward on the inclination. Thus, the present inventor has found a problem in which the driver needs to support the motorcycle body only by his or her left foot at the time of starting the motorcycle, thus making the motorcycle body unstable.

Other problems of the related art and new features of the present invention will become apparent from the following descriptions of the specification and attached drawings.

According to an embodiment, a motorcycle controls a pressurizing process in which a pressurizing unit applies an oil pressure to a rear brake based on a detection result of a vehicle speed and a detection result indicating as to whether or not a clutch lever is gripped.

The above embodiment can contribute to solve the above problem.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, embodiments will be described. To clarify the description, some parts thereof and some of the drawings have been omitted or simplified as appropriate. The same elements are denoted by the same reference signs throughout the drawings, and repeated descriptions are omitted.

(1) First Embodiment

(1-1) Configuration of First Embodiment

A first embodiment is mainly applied to motorcycles that are intended to travel on public roads, and an aim of the first embodiment is to improve motorcycle body stability when such motorcycles are started.

Figure 1:
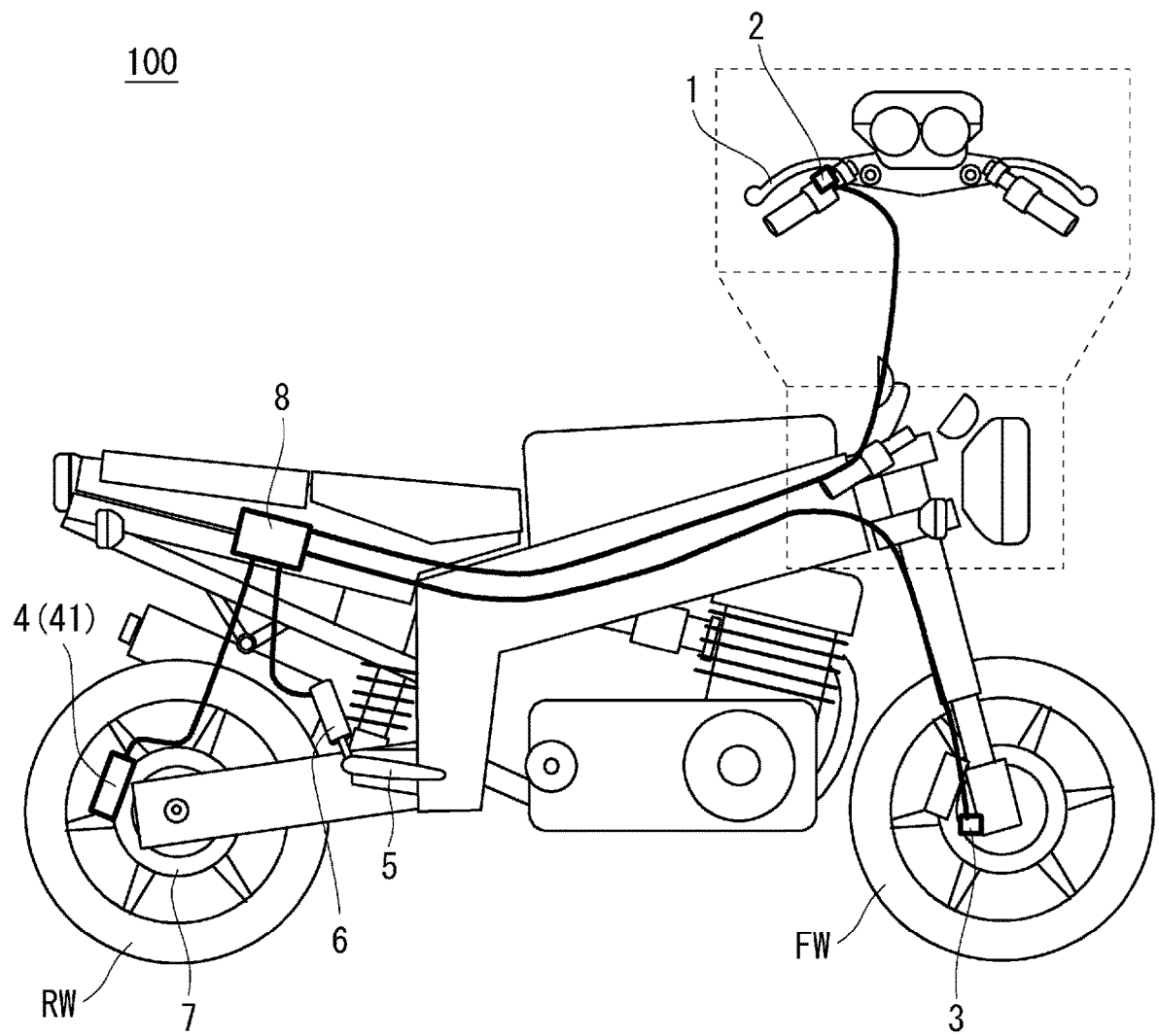
FIG. 1 is a perspective side view showing an example of an external structure of a motorcycle according to a first embodiment.

FIG. 1 is a perspective side view showing an example of an external structure of a motorcycle 100 according to a first embodiment. Note that FIG. 1 also shows a planar view of a handlebar part when the motorcycle 100 is viewed from above. In the following descriptions, only components related to the first embodiment will be described among components constituting the motorcycle 100, and descriptions of the components shown in FIG. 1 other than those related to the first embodiment will be omitted.

As shown in FIG. 1, the motorcycle 100 according to the first embodiment includes a clutch lever 1, a clutch switch (a clutch SW) 2, a vehicle speed sensor 3, a hydraulic rear brake 4, a rear brake pedal 5, a rear brake master cylinder 6, a rear brake rotor 7, a launch assist unit 8, a front wheel FW, and a rear wheel RW.

The clutch lever 1 is provided in a left handlebar and operates a clutch mechanism (not shown).

The clutch switch 2 is provided near the clutch lever 1 of the left handlebar and detects whether or not the clutch lever 1 is gripped. The clutch switch 2 is switched on/off according to a status of the clutch lever 1, which is gripped or released. The clutch switch 2 outputs a signal indicating on/off of the clutch switch 2 to a microcontroller 84 inside the launch assist unit 8, which will be described later. This enables the microcontroller 84 to detect whether or not the clutch lever 1 is gripped. In the first embodiment, the clutch switch 2 is switched on when the clutch lever 1 is gripped, whereas the clutch switch 2 is switched off when the clutch lever 1 is released. However, the clutch switch 2 is not limited to this. The clutch switch 2 may be the one that is switched off when the clutch lever 1 is gripped and switched on when the clutch lever 1 is released.

The vehicle speed sensor 3 detects a vehicle speed of the motorcycle 100. The vehicle speed sensor 3 outputs a signal indicating the vehicle speed detected by the vehicle speed sensor 3 to the microcontroller 84 inside the launch assist unit 8, which will be described later. This enables the microcontroller 84 to detect the vehicle speed of the motorcycle 100. In the first embodiment, the vehicle speed sensor 3 is provided in the front wheel FW and detects the vehicle speed of the motorcycle 100 according to the number of rotations of the front wheel FW. However, the vehicle speed sensor 3 is not limited to this. A position where the vehicle speed 3 is installed and a method of detecting the vehicle speed are arbitrary as long as the vehicle speed sensor 3 can detect the vehicle speed of the motorcycle 100.

The rear brake master cylinder 6 converts a foot force when a driver steps on the rear brake pedal 5 into an oil pressure and supplies the converted oil pressure to the rear brake 4 through an oil line.

The rear brake 4 is a hydraulic brake and includes a rear brake caliper 41. The rear brake 4 brakes the rear wheel RW by pressing the rear brake caliper 41 against the rear brake rotor 7 that is rotated together with the rear wheel RW by the oil pressure supplied through the oil line.

The launch assist unit 8 performs an assist in order to improve motorcycle body stability when the motorcycle 100 is to be started.

Figure 2:
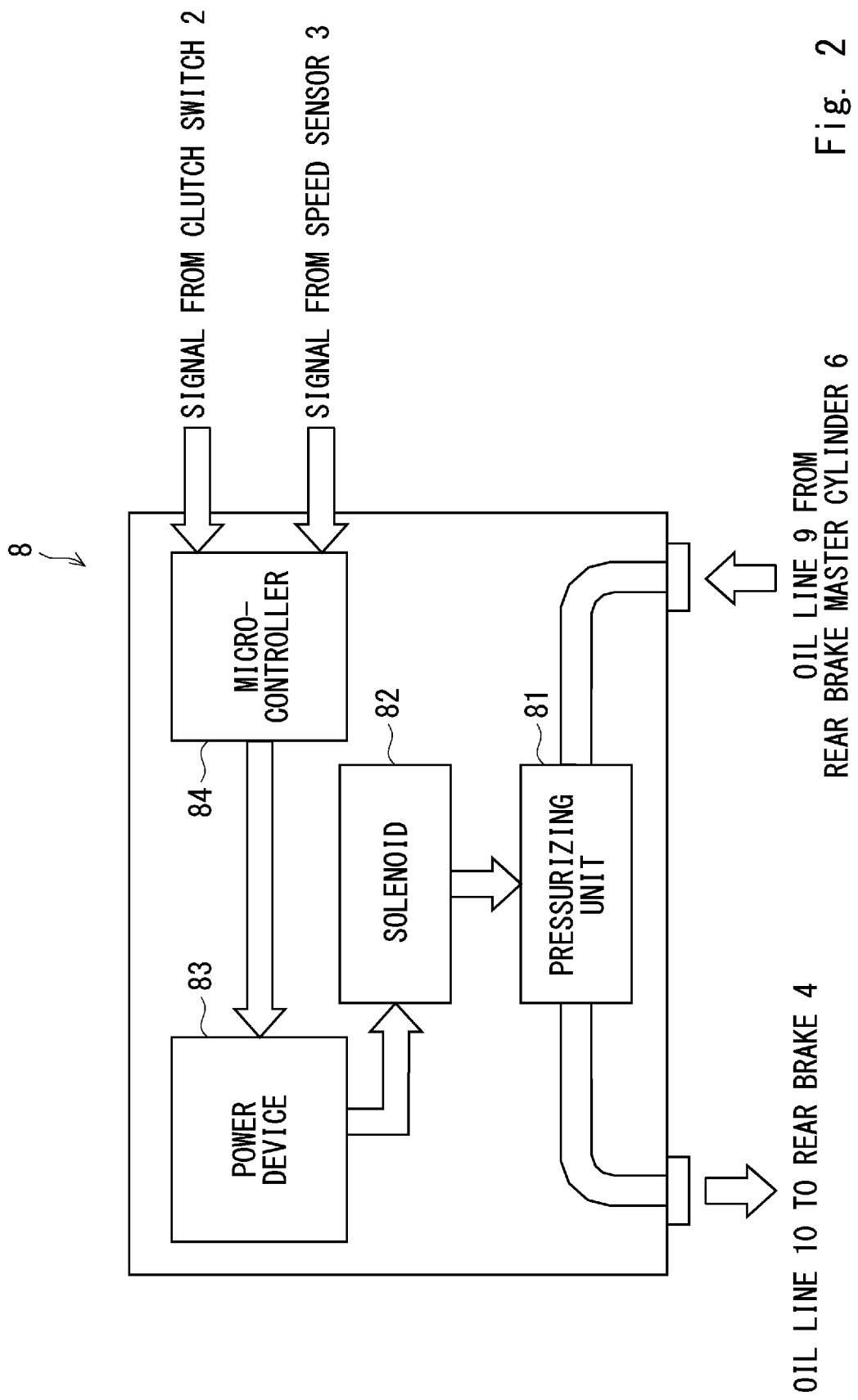
FIG. 2 is a block diagram showing an example of a functional block of a launch assist unit according to the first embodiment.

FIG. 2 is a block diagram showing an example of a functional block of the launch assist unit 8 according to the first embodiment.

As shown in FIG. 2, the launch assist unit 8 according to the first embodiment includes a pressurizing unit 81, a solenoid 82, a power device 83, and a microcontroller 84. Note that in FIG. 2, the power device 83 and the microcontroller 84 are examples of components constituting a semiconductor device.

The pressurizing unit 81 is inserted on the oil line between the rear brake master cylinder 6 and the rear brake 4 (the rear brake caliper 41) and performs a process to apply the oil pressure to the rear brake 4 (the process by the pressurizing unit 81 to supply the oil pressure to the rear brake 4 will be hereinafter referred to as a pressurizing process). That is, the configuration of the first embodiment enables the oil pressure to be supplied to the rear brake 4 by the pressurizing unit 81 not only by an operation of the rear brake pedal 5. Hereinafter, an oil line on the side of the rear brake master cylinder 6 as seen from the pressurizing unit 81 side shall be referred to as an oil line 9, and an oil line on the side of the rear brake 4 as seen from the pressurizing unit 81 side shall be referred to as an oil line 10.

The microcontroller 84 controls the pressurizing process performed by the pressurizing unit 81 on the rear brake 4 based on the signals from the clutch switch 2 and the vehicle speed sensor 3. When the microcontroller 84 controls the pressurizing unit 81 to perform the pressurizing process, the microcontroller 84 outputs a control signal (not shown) to turn on the power device 83. The power device 83, which has been turned on, outputs the control signal 12, which will be described later, to turn on the solenoid 82. When the solenoid 82 is turned on, a piston 11, which will be described later, inside the pressurizing unit 81 starts an up and down reciprocating movement to thereby apply the oil pressure to the rear brake 4.

Figure 3:
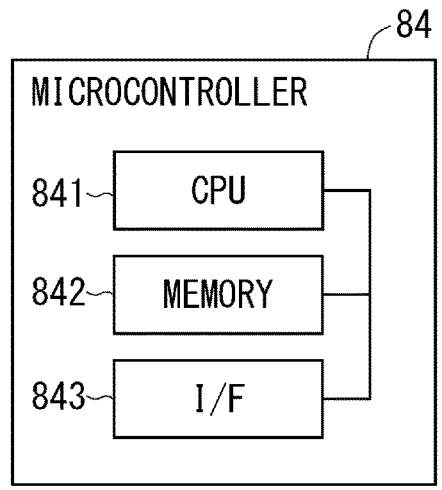
FIG. 3 is a block diagram showing an example of a functional block of a microcontroller according to the first embodiment.

FIG. 3 is a block diagram showing an example of the functional block of the microcontroller 84 according to the first embodiment.

As shown in FIG. 3, the microcontroller 84 is composed of hardware such as a CPU (Central Processing Unit) 841 that performs, for example, arithmetic processing, control processing, and the like, a memory 842 including a ROM (Read Only Memory) or a RAM (Random Access Memory) for storing a program(s) executed by the CPU 841 and various kinds of data, an interface (I/F) unit 843 that inputs and outputs signals with outside. Further, the CPU 841, the memory 842, and the interface unit 843 are connected to one another through a data bus or the like.

The above program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 4:
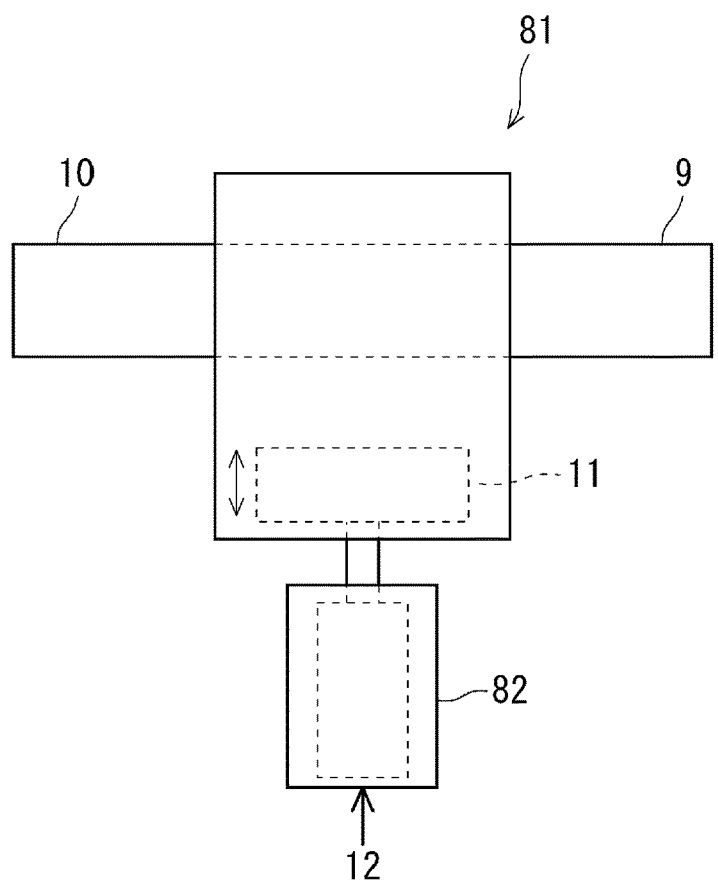
FIG. 4 is a perspective front view showing an example of a pressurizing unit and its peripheral configuration according to the first embodiment.

FIG. 4 is a perspective front view showing an example of the pressurizing unit 81 and its peripheral configuration according to the first embodiment.

As shown in FIG. 4, the pressurizing unit 81 is connected to the oil line 9, which is connected to the rear brake master cylinder 6, and also connected to the oil line 10, which is connected to the rear brake 4.

Further, the pressurizing unit 81 includes the piston 11. When the solenoid 82 is turned on according to the control signal 12 from the power device 83, the piston 11 starts the up and down reciprocating movement in response. The reciprocating movement of the piston 11 generates the oil pressure, and the generated oil pressure is applied to the rear brake 4 through the oil line 10.

(1-2) Operation of First Embodiment

An operation of the motorcycle 100 according to the first embodiment will be described below.

Figure 5:
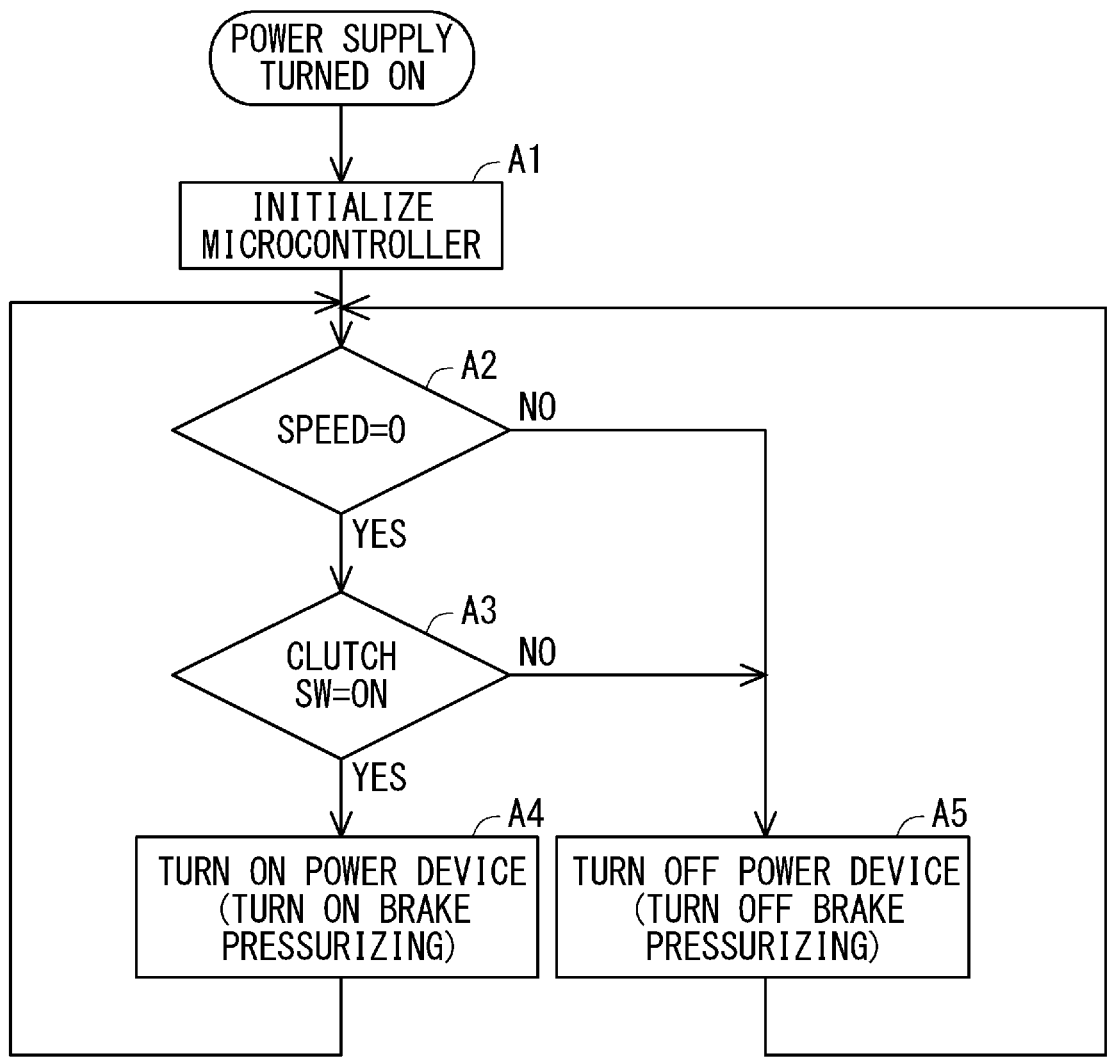
FIG. 5 is a flowchart showing an example of a control method of the motorcycle according to the first embodiment.

FIG. 5 is a flowchart showing an example of a control method of the motorcycle 100 according to the first embodiment.

As shown in FIG. 5, when a power supply is turned on by starting an engine of the motorcycle 100, firstly the microcontroller 84 inside the launch assist unit 8 is initialized (step A1). After that, a signal indicating as to whether the clutch switch 2 is switched on or off is input to the microcontroller 84 from the clutch switch 2 provided near the clutch lever 1, and a signal indicating a vehicle speed of the motorcycle 100 detected by the vehicle speed sensor 3 is input to the microcontroller 84 from the vehicle speed sensor 3.

Next, the microcontroller 84 evaluates as to whether or not the signal from the vehicle speed sensor 3 indicates the vehicle speed=0 km/h (step A2).

In the step A2, if the signal from the vehicle speed sensor 3 indicates the vehicle speed=0 km/h (Yes in the step A2), the microcontroller 84 then evaluates as to whether or not the signal from the clutch switch 2 indicates that the clutch switch 2 is on (step A3).

In the step A3, if the signal from the clutch switch 2 indicates that the clutch switch 2 is on (Yes in the step A3), the microcontroller 84 detects that the clutch lever 1 is gripped and performs control to turn on the power device 83 and turn on the solenoid 82 to thereby turn on the pressurizing process performed by the pressurizing unit 81 on the rear brake 4 (i.e., The pressurizing process is executed. In the following descriptions, when it is referred that the pressurizing process is turned on, it indicates that the pressurizing process is executed) (step A4). In this way, the rear wheel RW is braked by the rear brake 4.

After that, the process returns to the step A2, and the microcontroller 84 leaves the power device 83 on until it is evaluated as "No" in either of the step A2 or A3 to thereby maintain the pressurizing process performed by the pressurizing unit 81 on the rear brake 4 to be on.

On the other hand, in the step A2, if the signal from the vehicle speed sensor 3 indicates the vehicle speed≠0 km/h (No in the step A2), the microcontroller 84 performs control to turn off the power device 83 even if the signal from the clutch switch 2 indicates that the clutch switch 2 is on to thereby turn off the pressurizing process performed by the pressurizing unit 81 on the rear brake 4 (i.e., The pressurizing process is not executed. In the following descriptions, when it is referred that the pressurizing process is turned off, it indicates that the pressurizing process is not executed) (step A5).

Further, in the step A3, if the signal from the clutch switch 2 indicates that the clutch switch 2 is off (No in step A3), the microcontroller 84 detects that the clutch lever 1 is released and performs control to turn off the power device 83 to thereby turn off the pressurizing process performed by the pressurizing unit 81 on the rear brake 4 (step A5).

(1-3) Advantageous Effect of First Embodiment

According to the first embodiment, the microcontroller 84 controls the pressurizing process performed by the pressurizing unit 81 on the rear brake 4 based on the signal indicating as to whether the clutch switch 2 is switched on or off, which corresponds to the state of the clutch lever 1 that is gripped or released, and the signal indicating the vehicle speed detected by the vehicle speed sensor 3.

Accordingly, the driver can brake the rear wheel RW by an operation of the clutch lever 1 when he or she starts the motorcycle 100 on an inclined place such as a slope. By doing so, as the driver can support the motorcycle body of the motorcycle 100 by his or her both feet when the motorcycle 100 is to be started, the motorcycle body stability of the motorcycle 100 is improved.

(2) Second Embodiment

(2-1) Configuration of Second Embodiment

Recently, Motorcycle Federation of Japan revised play rules of sport competitions for motorcycles into more strict rules in an evaluation of vehicle movements at the time of a signal light start. More specifically, it is now forbidden in the rules to move a motorcycle body of a motorcycle forward and backward at the time of a signal light start, and if the motorcycle body is moved, it is determined as a false start.

The second embodiment is mainly applied to motorcycles intended for sports competitions, and an aim of the second embodiment is to improve motorcycle body stability when such motorcycles are started.

Figure 6:
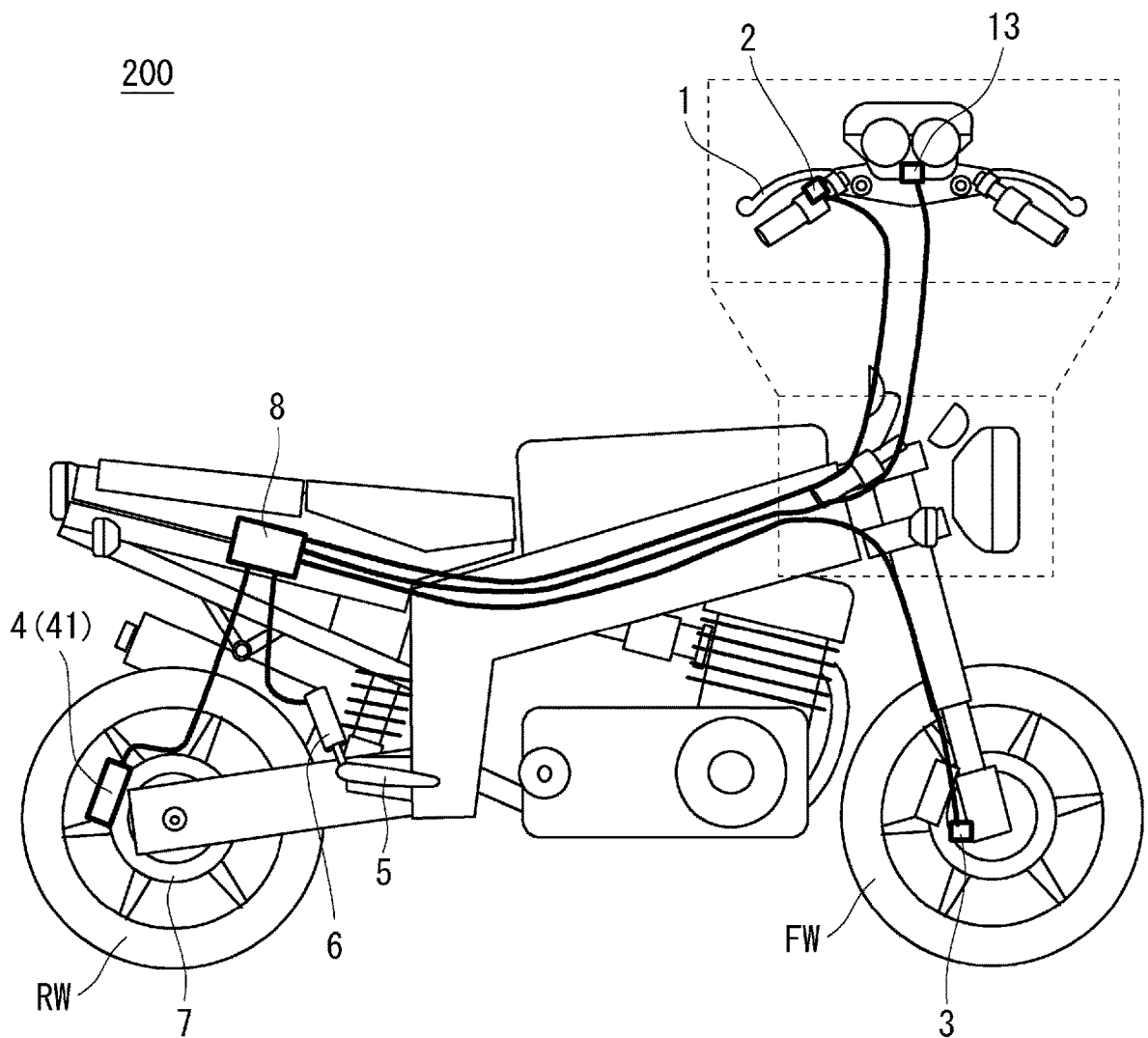
FIG. 6 is a perspective side view showing an example of an external structure of a motorcycle according to a second embodiment.

FIG. 6 is a perspective side view showing an example of an external structure of a motorcycle 200 according to the second embodiment. Note that FIG. 6 also shows a planar view of a handlebar part when the motorcycle 200 is viewed from above. In the following descriptions, only components related to the second embodiment will be described among components constituting the motorcycle 200, and descriptions of the components shown in FIG. 6 other than those related to the second embodiment will be omitted.

As shown in FIG. 6, a difference between the motorcycle 200 according to the second embodiment and the motorcycle 100 according to the first embodiment is that a mode switch (a mode SW) 13 is further included in the handlebar part of the motorcycle 200 according to the second embodiment. The configuration of the motorcycle 200 according to the second embodiment other than the mode switch 13 is the same as that of the motorcycle 100 according to the first embodiment.

In the second embodiment, there are two modes, a normal mode and a launch assist mode (a specific mode). The launch assist mode is a mode that enables the pressurizing process performed by the pressurizing unit 81 on the rear brake 4.

In the second embodiment, when the mode is switched to the launch assist mode, and the pressurizing process performed by the pressurizing unit 81 on the rear brake 4 is enabled, the pressurizing process performed by the pressurizing unit 81 on the rear brake 4 is turned on if the signal from the vehicle speed sensor 3 indicates the vehicle speed=0 km/h and the signal from the clutch switch 2 indicates that the clutch switch 2 is on.

On the other hand, when the mode has not been switched to the launch assist mode, and the pressurizing process performed by the pressurizing unit 81 on the rear brake 4 is disabled, the pressurizing process performed by the pressurizing unit 81 on the rear brake 4 will not be turned on even if the signal from the clutch switch 2 indicates that the clutch switch 2 is on and the signal from the vehicle speed sensor 3 indicates the vehicle speed=0 km/h.

The mode switch 13 is a switch that is switched on when the mode is switched to the launch assist mode by being pressed by a driver. The mode switch 13 outputs a signal indicating as to whether the mode switch 13 is on or off to the microcontroller 84 inside the launch assist unit 8. This enables the microcontroller 84 to detect whether or not the mode has been switched to the launch assist mode. In the second embodiment, although the mode switch 13 is provided near almost center of the handlebar, it is not limited to this. The mode switch 13 may be installed in the handlebar part, and a position where the mode switch 13 is installed is not limited to near almost center of the handlebar.

Figure 7:
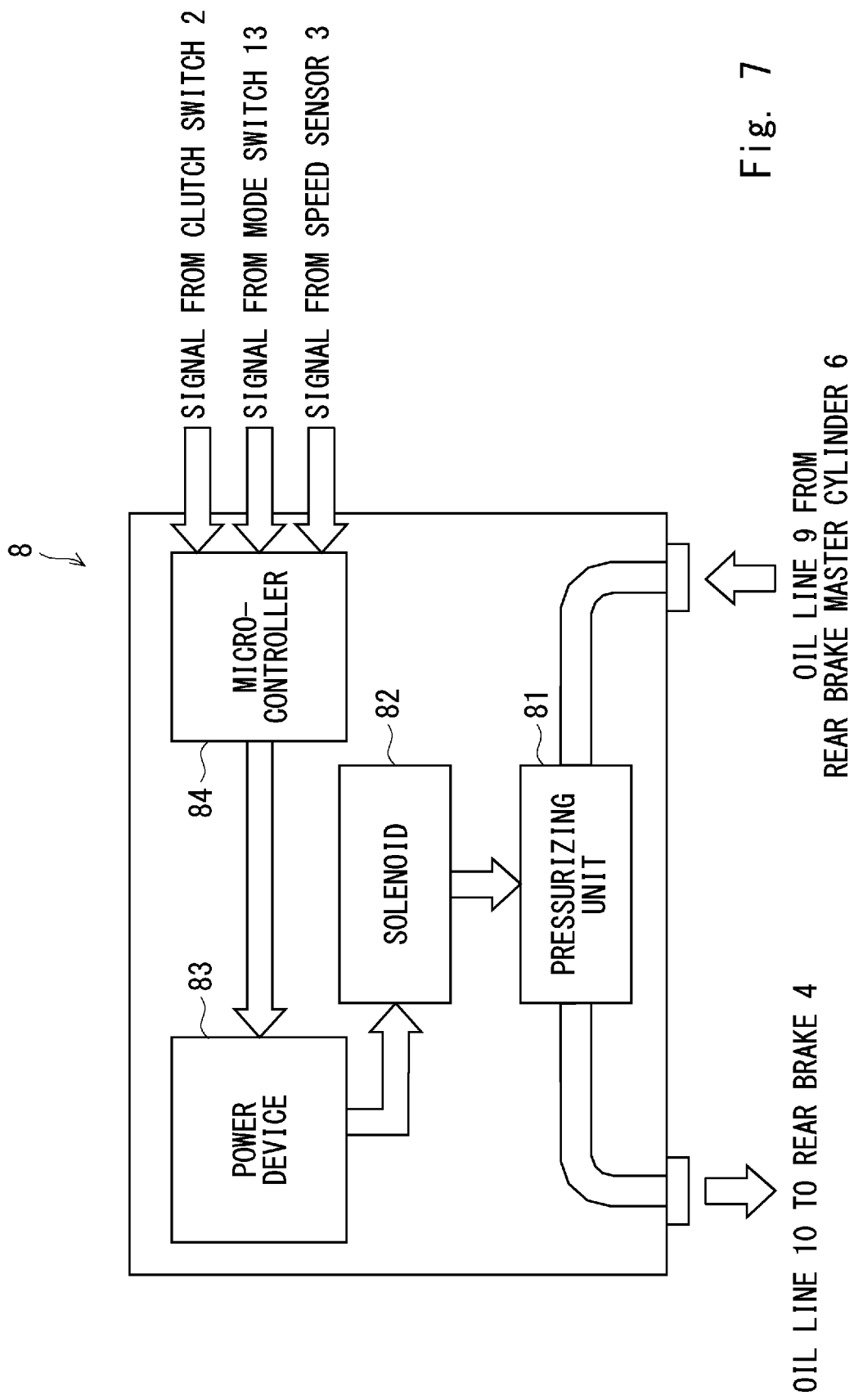
FIG. 7 is a block diagram showing an example of a functional block of a launch assist unit according to the second embodiment.

FIG. 7 is a block diagram showing an example of a functional block of the launch assist unit 8 according to the second embodiment.

As shown in FIG. 7, a difference between the launch assist unit 8 according to the second embodiment and the launch assist unit 8 according to the first embodiment is that the signal from the mode switch 13 is input to the microcontroller 84 of the second embodiment. The configuration of the launch assist unit 8 according to the second embodiment other than the one mentioned above is the same as that of the launch assist unit 8 according to the first embodiment.

The microcontroller 84 controls the pressurizing process performed by the pressurizing unit 81 on the rear brake 4 based on the signals from the clutch switch 2, the vehicle speed sensor 3, and the mode switch 13. When the microcontroller 84 controls the pressurizing unit 81 to perform the pressurizing process, the microcontroller 84 outputs a control signal (not shown) to turn on the power device 83. The power device 83, which has been turned on, outputs the control signal 12 to turn on the solenoid 82. When the solenoid 82 is turned on, the piston 11 inside the pressurizing unit 81 starts an up and down reciprocating movement to thereby apply the oil pressure to the rear brake 4.

Note that in the second embodiment, as the configuration of the functional block of the microcontroller 84 is the same as the configuration shown in FIG. 3 according to the first embodiment, the description thereof will be omitted. Further, as the pressurizing unit 81 and its peripheral configuration are the same as those according to the first embodiment shown in FIG. 4, the description thereof will be omitted.

(2-2) Operation of Second Embodiment

Hereinafter, an operation of the motorcycle 200 according to the second embodiment will be described.

Figure 8:
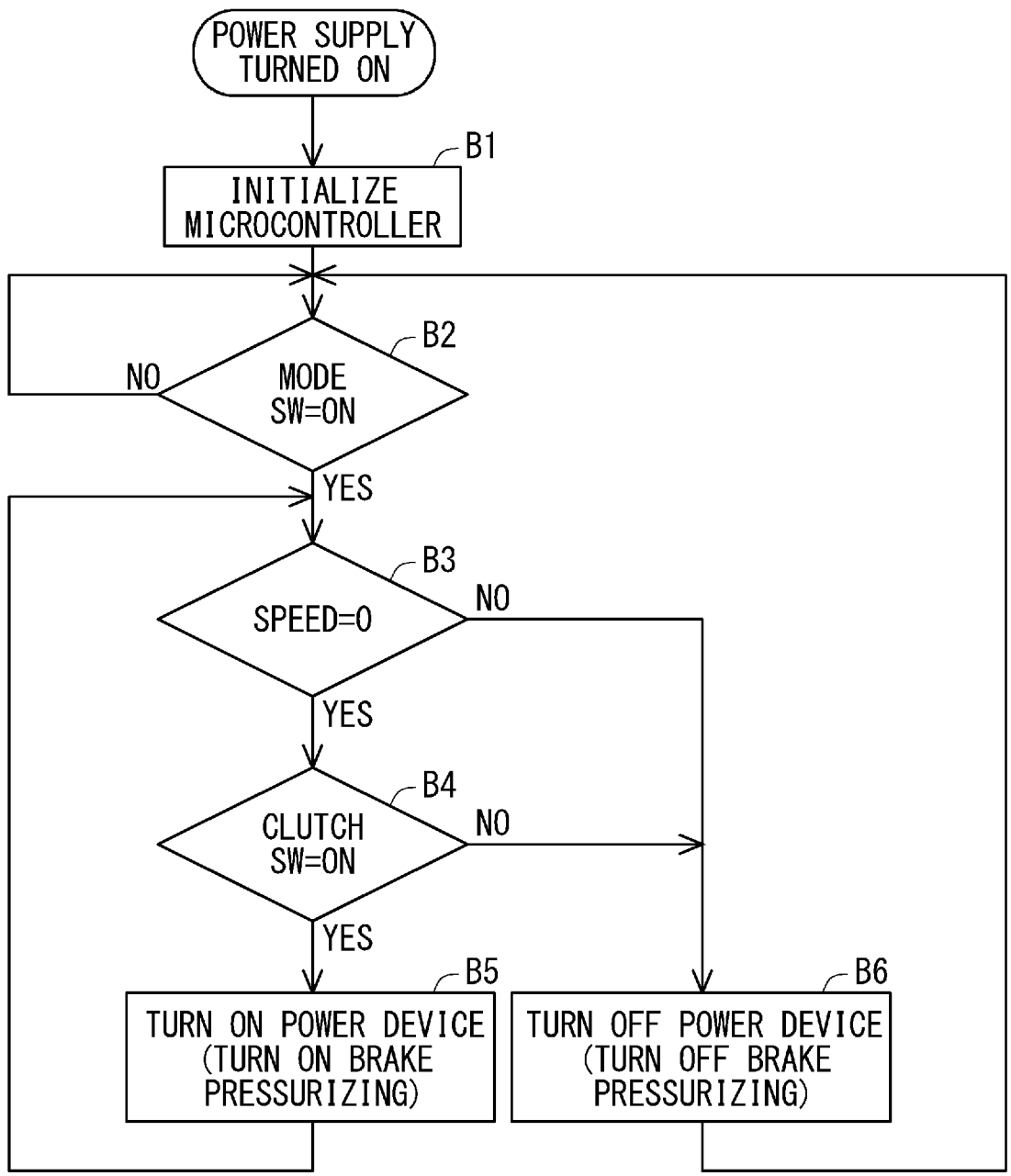
FIG. 8 is a flowchart showing an example of a control method of the motorcycle according to the second embodiment.

FIG. 8 is a flowchart showing a control method of the motorcycle 200 according to the second embodiment.

As shown in FIG. 8, when a power supply is turned on by starting an engine of the motorcycle 200, firstly the microcontroller 84 inside the launch assist unit 8 is initialized (step B1). After that, a signal indicating as to whether the clutch switch 2 is switched on or off is input to the microcontroller 84 from the clutch switch 2 provided near the clutch lever 1, a signal indicating a vehicle speed of the motorcycle 200 detected by the vehicle speed sensor 3 is input to the microcontroller 84 from the vehicle speed sensor 3, and a signal indicating as to whether the mode switch 13 is on or off is input to the microcontroller 84 from the mode switch 13.

Next, the microcontroller 84 evaluates as to whether or not the signal from the mode switch 13 indicates that the mode switch 13 is on (step B2). In the step B2, if the signal from the mode switch 13 does not indicate that the mode switch 13 is on (No in the step B2), the process returns to the step B2 and the same evaluation as the one in the step B2 is performed. In this way, if the signal from the mode switch 13 does not indicate that the mode switch 13 is on, the microcontroller 84 detects that the mode has not been switched to the launch assist mode and disables the pressurizing process performed by the pressurizing unit 81 on the rear brake 4. That is, the microcontroller 84 does not turn on the pressurizing process performed by the pressurizing unit 81 on the rear brake 4 even if the signal from the clutch switch 2 indicates that the clutch switch 2 is on and the signal from the vehicle speed sensor 3 indicates the vehicle speed=0 km/h.

In the step B2, if the signal from the mode switch 13 indicates that the mode switch 13 is on (Yes in the step B2), the microcontroller 84 detects that the mode has been switched to the launch assist mode and enables the pressurizing process performed by the pressurizing unit 81 on the rear brake 4. Next, the microcontroller 84 evaluates as to whether or not the signal from the vehicle speed sensor 3 indicates the vehicle speed=0 km/h (step B3).

In the step B3, if the signal from the vehicle speed sensor 3 indicates the vehicle speed=0 km/h (Yes in the step B3), the microcontroller 84 then evaluates as to whether or not the signal from the clutch switch 2 indicates that the clutch switch 2 is on (step B4).

In the step B4, if the signal from the clutch switch 2 indicates that the clutch switch 2 is on (Yes in the step B4), the microcontroller 84 detects that the clutch lever 1 is gripped and performs control to turn on the power device 83 and turn on the solenoid 82 to thereby turn on the pressurizing process performed by the pressurizing unit 81 on the rear brake 4 (step B5). In this way, the rear wheel RW is braked by the rear brake 4.

After that, the process returns to the step B3, and the microcontroller 84 leaves the power device 83 on until it is evaluated as "No" in either of the step B3 or B4 to thereby maintain the pressurizing process performed by the pressurizing unit 81 on the rear brake 4 to be on.

On the other hand, in the step B3, if the signal from the vehicle speed sensor 3 indicates the vehicle speed≠0 km/h (No in the step B3), the microcontroller 84 performs control to turn off the power device 83 even if the signal from the clutch switch 2 indicates that the clutch switch 2 is on to thereby turn off the pressurizing process performed by the pressurizing unit 81 on the rear brake 4 (step B6).

Further, in the step B4, if the signal from the clutch switch 2 indicates that the clutch switch 2 is off (No in step B4), the microcontroller 84 detects that the clutch lever 1 is released and performs control to turn off the power device 83 to thereby turn off the pressurizing process performed by the pressurizing unit 81 on the rear brake 4 (step B6).

At a sport competition in which the motorcycle 200 participates, the pressurizing process performed by the pressurizing unit 81 on the rear brake 4 needs to be enabled at a signal light start. After the pressurizing process performed by the pressurizing unit 81 on the rear brake 4 is turned on (step B5), if the vehicle speed becomes≠0 km/h (No in the step B3) or if the clutch switch 2 is turned off (No in the step B4), the motorcycle 200 is considered to have gone through the signal light start, and thus it is not necessary to stay in the launch assist mode.

Thus, in the second embodiment, after the microcontroller 84 turns on the pressurizing process performed by the pressurizing unit 81 on the rear brake 4 in the step B5, if it is evaluated as "No" in either of the step B3 or B4, the mode is switched from the launch assist mode to the normal mode.

In such a configuration, it is preferable to notify the driver as to whether or not the current mode is the launch assist mode because the mode is switched from the launch assist mode without an operation on the mode switch 13 by the driver. Accordingly, in the second embodiment, a notification unit (not shown) that notifies the driver when the current mode is the launch assist mode may be included. A configuration of the notification unit may be arbitrarily determined. For example, when the current mode is the launch assist mode, a lamp provided at an arbitrary position of the handlebar may be switched on, while when the current mode is the normal mode, the lamp may be switched off.

(2-3) Advantageous Effect of Second Embodiment

According to the second embodiment, the microcontroller 84 controls the pressurizing process performed by the pressurizing unit 81 on the rear brake 4 based on the signal indicating as to whether the clutch switch 2 is on or off, which corresponds to the state of the clutch lever 1 that is gripped or released, the signal indicating the vehicle speed detected by the vehicle speed sensor 3, and the signal indicating as to whether the mode switch 13 is on or off.

By doing so, at the time of a signal light start at a sport competition in which the motorcycle 200 participates, the driver can turn on the mode switch 13 in order to switch the mode to the launch assist mode and brake the rear wheel RW by an operation of the clutch lever 1. Accordingly, as the driver can support the motorcycle body of the motorcycle 200 by his or her both feet at the time of a signal light start, the vehicle stability of the motorcycle 200 is improved. Thus, it is possible to prevent the motorcycle body of the motorcycle 200 from moving and avoid an evaluation of a false start at the time of a signal light start.

(3) Third Embodiment

A third embodiment is an embodiment that has extracted concepts of the above first and second embodiments.

Figure 9:
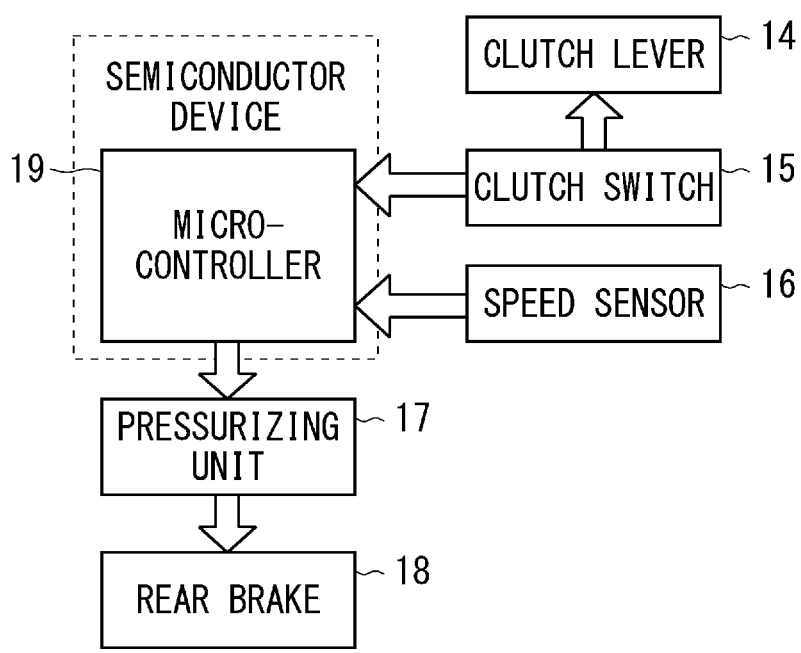
FIG. 9 is a block diagram showing an example of a functional block of a motorcycle according to a third embodiment.

FIG. 9 is a block diagram showing an example of a functional block of a motorcycle 300 according to a third embodiment. Note that FIG. 9 shows only components related to the third embodiment, and components other than those related to the third embodiment are omitted.

As shown in FIG. 9, the motorcycle 300 according to the third embodiment includes a clutch lever 14, a clutch switch (a clutch SW) 15, a vehicle speed sensor 16, a pressurizing unit 17, a hydraulic rear brake 18, and a microcontroller 19.

The clutch lever 14 operates a clutch mechanism (not shown). The clutch lever 14 corresponds to the clutch lever 1 according to the first and second embodiments.

The clutch switch 15 detects whether or not the clutch lever 14 is gripped. The clutch switch 15 corresponds to the clutch switch 2 according to the first and second embodiments.

The vehicle speed sensor 16 detects a vehicle speed of the motorcycle 300. The vehicle speed sensor 16 corresponds to the vehicle speed sensor 3 according to the first and second embodiments.

The pressurizing unit 17 performs a process to apply an oil pressure to the rear brake 18 (the process by the pressurizing unit 17 to supply the oil pressure to the rear brake 18 will be hereinafter referred to as a pressurizing process). The pressurizing unit 17 corresponds to the pressurizing unit 81 according to the first and second embodiments.

The rear brake 18 is a hydraulic brake and brakes the rear wheel RW (not shown) by the oil pressure applied by the pressurizing unit 17. The rear brake 18 corresponds to the rear brake 4 according to the first and second embodiment.

The microcontroller 19 controls the pressurizing process performed by the pressurizing unit 17 on the rear brake 18 based on results of the detection by the vehicle speed sensor 16 and the clutch switch 15. The microcontroller 19 is an example of a component constituting a semiconductor device and corresponds to the microcontroller 84 according to the first and second embodiments.

More specifically, if the vehicle speed detected by the vehicle speed sensor 16 is 0 km/h and the clutch switch 15 detects that the clutch lever 14 is gripped, the microcontroller 19 controls the pressurizing unit 17 to perform the pressurizing process on the rear brake 18.

Note that as in the second embodiment, the motorcycle 300 according to the third embodiment may include a mode switch for switching the mode to the launch assist mode (a specific mode) in which the pressurizing process on the rear brake 18 by the pressurizing unit 17 is enabled. In such a case, while the mode is in the launch assist mode, which has been switched by the above mode switch, if the vehicle speed detected by the vehicle speed sensor 16 is 0 km/h and the clutch switch 15 detects that the clutch lever 14 is gripped, the microcontroller 19 controls the pressurizing unit 17 to perform the pressurizing process on the rear brake 18.

Further, as in the second embodiment, the motorcycle 300 according to the third embodiment may include, inside a semiconductor device, a notification unit that notifies the driver when the mode is in the launch assist mode, which has been switched by the mode switch.

Moreover, in the motorcycle 300 according to the third embodiment, after the microcontroller 19 controls the pressurizing unit 17 to perform the pressurizing process on the rear brake 18 as in the second embodiment, if the vehicle speed sensor 16 detects that the vehicle speed is not 0 km/h or if the clutch switch 15 detects that the clutch lever 14 is not gripped, the mode may be switched from the launch assist mode.

Recently, some four-wheeled vehicles have a function called hill start assist. The hill start assist is a function that prevents a vehicle from moving backward or forward when a driver moves his or her foot from a brake pedal to step on an accelerator pedal. The hill start assist function is irrelevant to the function in which a rear brake is interlocked with a clutch lever, which is a feature of this embodiment.

Moreover, vehicle postures of four-wheeled vehicles, which are in a stationary state, will not become unstable by any operation of a driver. Thus, four-wheeled vehicles require techniques different from those of motorcycles that may possibly fall when the motorcycles are started on a slope.

Although the invention made by the present invention has been described in detail based on the embodiments, it is obvious that the present invention is not limited to the above-mentioned embodiments and various modifications can be made without departing from the scope of the invention.

For example, although it has been described that the second embodiment is mainly applied to motorcycles intended for sports competitions, it may be applied to motorcycles intended to travel on public roads.

If the motorcycle according to the first embodiment is applied to motorcycles intended to travel on public roads, as a mode switch is not included in the motorcycle according to the first embodiment, the pressurizing process performed by the pressurizing unit on the rear brake is applied when the motorcycle is to be started on a flat place not only on an inclined place such as a slope.

On the other hand, when the motorcycle according to the second embodiment is applied to a motorcycle intended to travel on public roads, as the mode switch is included in the motorcycle according to the second embodiment, for example, the mode switch may be switched on only on a inclined place such as a slope to apply the pressurizing process performed by the pressurizing unit on the rear brake.

The first, second, and third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A motorcycle comprising:
a clutch lever disposed in a handlebar of the motorcycle;
a clutch switch configured to detect whether or not the clutch lever is gripped;
a vehicle speed sensor configured to detect a vehicle speed;
a hydraulic rear brake;
a pressurizer configured to perform a pressurizing process, the pressurizing process applying an oil pressure to the rear brake; and
a microcontroller configured to control the pressurizing process by the pressurizer when the vehicle speed sensor detects that the vehicle speed is zero and the clutch switch detects that the clutch lever is gripped.

2. The motorcycle according to claim 1, wherein after controlling the pressurizing process by the pressurizer, the microcontroller is configured to maintain the pressurizing process until the vehicle speed sensor detects that the vehicle speed is not zero.

3. The motorcycle according to claim 1, wherein after controlling the pressurizing process by the pressurizer, the microcontroller is configured to maintain the pressurizing process until the clutch switch detects that the clutch lever is not gripped.

4. The motorcycle according to claim 1, wherein when the vehicle sensor detects that the vehicle speed is not zero and the clutch switch detects that the clutch lever is gripped, the microcontroller is configured not to control the pressurizing process.

5. The motorcycle according to claim 1,
wherein the clutch switch is switched on/off according to a status of the clutch lever, which is gripped or released;
wherein the clutch switch outputs a signal indicating on/off of the clutch switch to the microcontroller; and
wherein the microcontroller detects whether or not the clutch lever is gripped based on the signal from the clutch switch.

6. The motorcycle according to claim 1, further comprising a launch assist unit including the pressurizer and the microcontroller,
wherein the launch assist unit further comprises:
a first oil line coupled to a rear brake pedal; and
a second oil line coupled to the rear brake,
wherein the pressurizer is coupled between the first oil line and the second oil line,
wherein the pressurizer is connected to the second oil line, which is connected to the rear brake,
wherein a first oil pressure into which is converted from foot force on the rear brake pedal, is supplied from the first oil line to the rear brake through the pressurizer and the second oil line, and
wherein a second oil pressure generated by the pressurizing process of the pressurizer when the vehicle speed sensor detects that the vehicle speed is zero and the clutch switch detects that the clutch lever is gripped is supplied to the rear brake through the second oil line.

7. The motorcycle according to claim 6, wherein the rear brake supplied based on the second oil pressure prevents a rear wheel of the motorcycle from moving backward or forward at the time of starting the motorcycle.

8. The motorcycle according to claim 6, further comprising a power device and a solenoid,
wherein when the microcontroller controls the pressurizer to perform the pressurizing process, the microcontroller outputs a first signal to turn on the power device;
wherein the power device, which has been turned on, outputs a second signal to turn the solenoid; and
wherein when the solenoid is turned on, a piston inside the pressurizer starts a movement to thereby apply the second oil pressure to the rear brake.

9. The motorcycle according to claim 1, further comprising a mode switch configured to switch a mode to a specific mode, the specific mode being a mode in which the pressurizing process by the pressurizer is enabled.

10. The motorcycle according to claim 9, wherein the microcontroller controls the pressurizer to perform the pressurizing process when the vehicle speed detects that the vehicle sensor is zero and the clutch switch detects that the clutch lever is gripped while the mode is in the specific mode, which has been switched by the mode switch.

11. The motorcycle according to claim 9, wherein the microcontroller does not control the pressurizer to perform the pressurizing process, independent of the results of detection by the vehicle speed sensor and the clutch switch while the mode is not in the specific mode, which is switched by the mode switch.

12. The motorcycle according to claim 9, wherein after the microcontroller controls the pressurizer to perform the pressurizing process, if the vehicle speed sensor detects that the vehicle speed is not zero, the mode is switched from the specific mode.

13. The motorcycle according to claim 9, wherein after the microcontroller controls the pressurizer to perform the pressurizing process, if the clutch switch detects that the clutch lever is not gripped, the mode is switched from the specific mode.

14. The motorcycle according to claim 9, further comprising a notifier configured to notify a driver that the mode is switched to the specific mode by the mode switch.

* * * * *